United States Patent
Wu et al.

(10) Patent No.: US 12,054,209 B2
(45) Date of Patent: Aug. 6, 2024

(54) ELECTRIC POWER STEERING TORQUE COMPENSATION

(71) Applicant: Motional AD LLC, Boston, MA (US)

(72) Inventors: Ning Wu, Singapore (SG); Hans Andersen, Singapore (SG); Francesco Seccamonte, Singapore (SG)

(73) Assignee: Motional AD LLC, Boston, MA (US)

( * ) Notice: Subject to any disclaimer, the term of this patent is extended or adjusted under 35 U.S.C. 154(b) by 93 days.

(21) Appl. No.: 17/328,905

(22) Filed: May 24, 2021

(65) Prior Publication Data

US 2021/0347408 A1    Nov. 11, 2021

Related U.S. Application Data

(63) Continuation of application No. 16/776,422, filed on Jan. 29, 2020, now Pat. No. 11,014,606.
(Continued)

(30) Foreign Application Priority Data

Mar. 14, 2019    (DK) .............................. PA201970163

(51) Int. Cl.
*B62D 6/04*    (2006.01)
*B62D 1/28*    (2006.01)
(Continued)

(52) U.S. Cl.
CPC ............... *B62D 6/04* (2013.01); *B62D 1/283* (2013.01); *B62D 5/0463* (2013.01);
(Continued)

(58) Field of Classification Search
CPC ........ B62D 6/04; B62D 1/283; B62D 5/0463; B62D 5/0475; B62D 15/025; B62D 6/002;
(Continued)

(56) References Cited

U.S. PATENT DOCUMENTS

| 5,907,277 A | 5/1999 | Tokunaga et al. |
| 6,625,530 B1 | 9/2003 | Bolourchi |

(Continued)

FOREIGN PATENT DOCUMENTS

| CN | 101134471 | 3/2008 |
| CN | 102264593 | 11/2011 |

(Continued)

OTHER PUBLICATIONS

[No Author Listed], "J3016: Taxonomy and Definitions for Terms Related to On-Road Motor Vehicle Automated Driving Systems" SAE International, Sep. 2016, 30 pages.
(Continued)

*Primary Examiner* — Sze-Hon Kong
(74) *Attorney, Agent, or Firm* — Fish & Richardson P.C.

(57) ABSTRACT

Among other things, we describe techniques for electric power steering torque compensation. Techniques are provided for a method implemented by a computer, e.g., a computer onboard an autonomous vehicle. A planning circuit onboard the vehicle and connected to an EPS of the vehicle determines a compensatory torque signal to modify an actual steering angle of a steering wheel of the vehicle to match an expected steering angle of the steering wheel. The planning circuit transmits the compensatory torque signal to a control circuit that controls the steering angle of the steering wheel. The EPS modifies the actual steering angle based on the compensatory torque signal resulting in a modified steering angle. The control circuit operates the vehicle based on the modified steering angle.

20 Claims, 16 Drawing Sheets

Related U.S. Application Data

(60) Provisional application No. 62/798,419, filed on Jan. 29, 2019.

(51) Int. Cl.
    *B62D 5/04*         (2006.01)
    *B62D 15/02*       (2006.01)
    *B60W 50/00*      (2006.01)
    *B62D 6/00*        (2006.01)

(52) U.S. Cl.
    CPC ......... *B62D 5/0475* (2013.01); *B62D 15/025* (2013.01); *B60W 2050/0024* (2013.01); *B60W 2050/0075* (2013.01); *B60W 2556/45* (2020.02); *B62D 6/002* (2013.01)

(58) Field of Classification Search
    CPC . B60W 2050/0024; B60W 2050/0075; B60W 2556/45
    See application file for complete search history.

(56) References Cited

U.S. PATENT DOCUMENTS

| | | | |
|---|---|---|---|
| 10,829,149 B1* | 11/2020 | Garimella | G05D 1/0212 |
| 11,014,606 B2 | 5/2021 | Wu et al. | |
| 2004/0256171 A1 | 12/2004 | Sugitani | |
| 2006/0129293 A1 | 6/2006 | Bemnzen et al. | |
| 2008/0047775 A1 | 2/2008 | Yamazaki | |
| 2011/0057510 A1 | 3/2011 | Yamashita et al. | |
| 2015/0057889 A1* | 2/2015 | Tamaizumi | B62D 5/0463 701/41 |
| 2015/0344065 A1 | 12/2015 | Lee et al. | |
| 2016/0121923 A1 | 5/2016 | Maeda et al. | |
| 2016/0251030 A1* | 9/2016 | Okada | G06T 1/0007 345/633 |
| 2017/0137023 A1 | 5/2017 | Anderson et al. | |
| 2017/0247048 A1* | 8/2017 | Namikawa | B62D 6/006 |
| 2017/0282972 A1 | 10/2017 | Moretti | |
| 2018/0111642 A1* | 4/2018 | Endo | B62D 6/008 |
| 2018/0186406 A1 | 7/2018 | Itou et al. | |
| 2018/0297631 A1* | 10/2018 | Miyatani | B62D 6/00 |
| 2018/0346021 A1* | 12/2018 | Wang | B62D 5/0463 |
| 2019/0023319 A1 | 1/2019 | Tyrrell et al. | |
| 2019/0225260 A1 | 7/2019 | Tsubaki et al. | |
| 2019/0256133 A1 | 8/2019 | Tsubaki et al. | |
| 2019/0291775 A1* | 9/2019 | Taki | B62D 5/046 |
| 2019/0359247 A1* | 11/2019 | Tsubaki | B62D 1/286 |
| 2019/0359250 A1* | 11/2019 | Isshiki | B62D 5/0463 |
| 2019/0362570 A1* | 11/2019 | Kikuta | B62D 6/00 |
| 2020/0005553 A1 | 1/2020 | Eyerman et al. | |
| 2020/0039576 A1* | 2/2020 | Shoji | B62D 5/0463 |
| 2020/0156698 A1 | 5/2020 | Tsubaki et al. | |
| 2020/0180692 A1* | 6/2020 | Hara | G06F 16/9537 |
| 2020/0239067 A1 | 7/2020 | Wu et al. | |
| 2020/0254996 A1 | 8/2020 | Kashiwamura | |
| 2020/0290668 A1* | 9/2020 | Moreillon | B62D 6/002 |
| 2020/0298904 A1 | 9/2020 | Kitazume et al. | |
| 2021/0061344 A1* | 3/2021 | Kitazume | B62D 1/286 |
| 2021/0179142 A1* | 6/2021 | Horibe | B60W 60/00184 |
| 2021/0253161 A1* | 8/2021 | Yoshida | B62D 6/00 |
| 2022/0063710 A1* | 3/2022 | Tsubaki | B62D 5/0421 |

FOREIGN PATENT DOCUMENTS

| | | |
|---|---|---|
| CN | 103674365 | 3/2014 |
| CN | 106494497 | 3/2017 |
| EP | 2987701 | 2/2016 |
| EP | 3382656 | 10/2018 |
| GB | 2496299 | 5/2013 |
| JP | 08026129 | 1/1996 |
| JP | 2005225421 | 8/2005 |
| JP | 2007326499 | 12/2007 |
| JP | 2012101677 | 5/2012 |
| JP | 2013193490 | 9/2013 |
| JP | 2017052353 | 3/2017 |
| JP | 2018081002 | 5/2018 |
| KR | 1020110051944 | 5/2011 |
| KR | 1020130026937 | 3/2013 |
| KR | 1020170093493 | 8/2017 |
| WO | WO 2018038108 | 3/2018 |
| WO | WO 2018084190 | 5/2018 |

OTHER PUBLICATIONS

DK 1rst Technical Examination in Danish Appln. No. PA 201970163, dated Jun. 19, 2019, 9 pages.

DK 2nd Technical Examination in Danish Appln. No. PA 201970163, dated Jan. 21, 2020, 5 pages.

DK 3rd Technical Examination in Danish Appln. PA 201970163, dated Sep. 16, 2020, 2 pages.

PCT International Search Report and Written Opinion in International Appln. No. PCT/IB2020/050714, dated May 8, 2020, 13 pages.

* cited by examiner

ELECTRIC POWER STEERING TORQUE COMPENSATION

CROSS-REFERENCE TO RELATED APPLICATIONS

This application is a continuation of and claims priority to U.S. patent application Ser. No. 16/776,422, filed Jan. 29, 2020, which claims priority to U.S. Provisional Patent Application No. 62/798,419, filed Jan. 29, 2019, and Danish Patent Application No. PA201970163, filed Mar. 14, 2019, the entire contents of each of which are incorporated herein by reference.

FIELD OF THE INVENTION

This description relates to electric power steering torque compensation.

BACKGROUND

An electric power steering (EPS) system is a system that applies a torque on a steering column of a vehicle to turn the vehicle one way or another. The EPS (sometimes called electric power-assisted steering) system is mounted on either the steering column or steering gear and applies torque to the steering column which turns the steering wheel. In an autonomous vehicle, an EPS system can apply a torque to the steering column, thereby controlling the operation of the vehicle.

SUMMARY

Techniques are provided for a method implemented by a computer, e.g., a computer onboard an autonomous vehicle. A planning circuit onboard the vehicle and connected to an EPS system of the vehicle determines a compensatory torque signal to modify an actual steering angle of a steering wheel of the vehicle to match an expected steering angle of the steering wheel. The planning circuit transmits the compensatory torque signal to a control circuit that controls the steering angle of the steering wheel. The EPS system modifies the actual steering angle based on the compensatory torque signal resulting in a modified steering angle. The control circuit operates the vehicle based on the modified steering angle.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
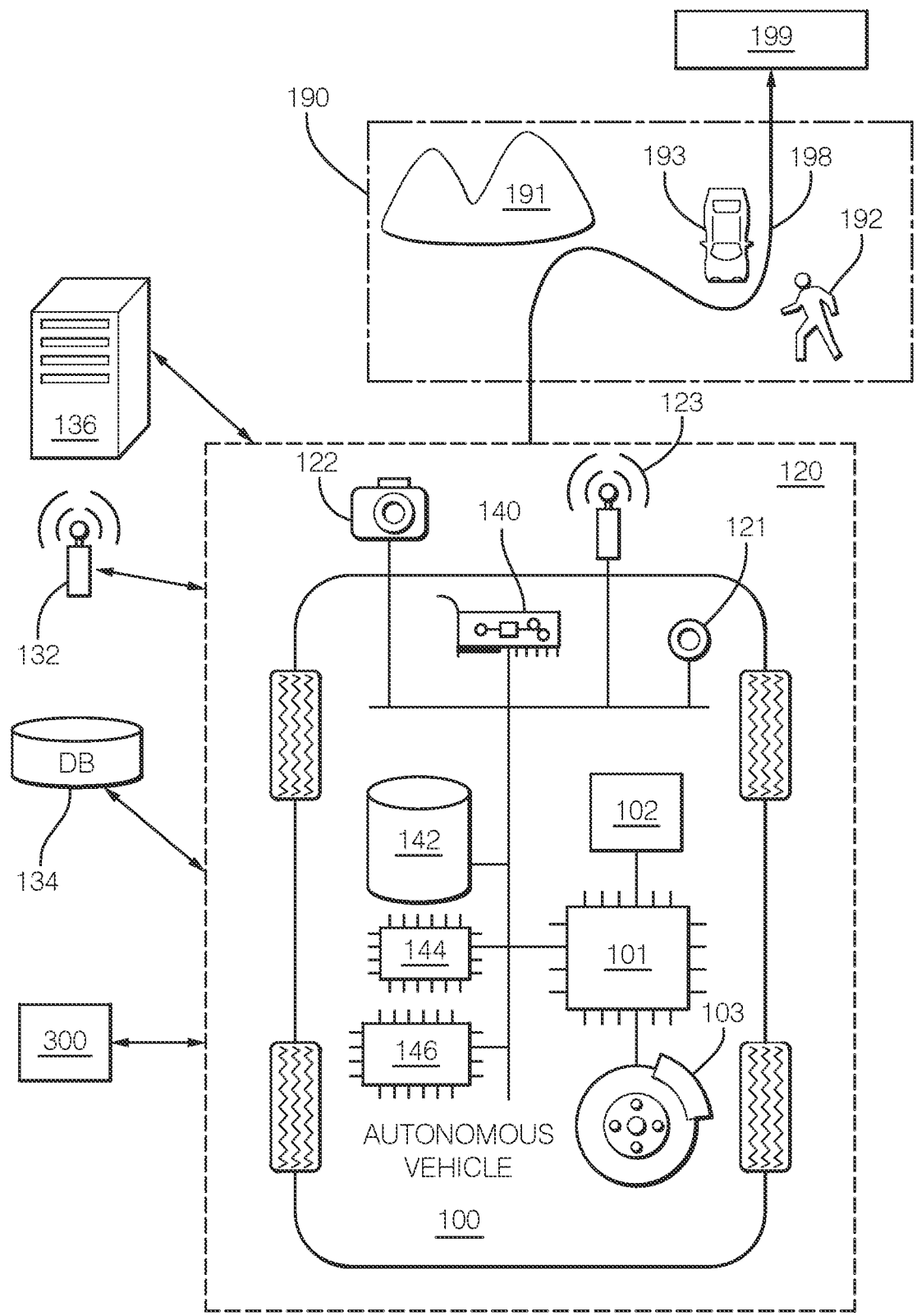
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control General Overview This disclosure describes an autonomous vehicle with a planning circuit (described below) onboard the vehicle that is connected to an EPS system of the vehicle. The EPS system is controlled by a control circuit that applies a base torque to a steering column of the vehicle to turn the steering wheel to a desired steering angle. In some embodiments, the control circuit determines a base torque that will result in the desired steering angle, determines a base torque signal (for example, a voltage signal) of a magnitude that corresponds to a magnitude of the base torque, and transmits the base torque signal to the EPS. In response, the EPS applies the base torque represented by the base torque signal to the steering column. In this manner, the base torque signal is expected to turn the steering wheel by the desired steering angle. In some instances, for example, at certain vehicle speeds, an actual steering angle by which the steering wheel turns in response to the base torque signal deviates from the desired (or expected) steering angle. In some embodiments, the actual steering angle is provided to the control circuit as a feedback signal and the base torque is compensated by a compensatory torque that further modifies the actual steering angle to substantially match the expected steering angle.

This disclosure describes applying a compensatory torque to the steering column as a feedforward signal, rather than as a feedback signal, based on knowing an expected deviation of the actual steering angle from the expected steering angle ahead of time, that is, before the base torque signal is applied to the EPS. The feedforward signal represents the amount of compensatory torque by which the base torque is to be adjusted (for example, increased or decreased) so that the actual steering angle substantially matches the expected steering angle. In other words, based on vehicle driving conditions, the planning circuit expects a deviation between an actual steering angle and an expected steering angle. As a proactive response, the planning circuit determines a compensatory torque signal to modify the actual steering angle of the steering wheel to match the expected steering angle, and transmits the compensatory torque signal to the control circuit. The control circuit modifies the base torque signal according to the compensatory torque signal and applies the modified torque signal to the EPS system. Embodiments of the disclosure are described with reference to torque applied to a steering column to turn a steering wheel connected to the steering column. The techniques described here are applicable to vehicles without a steering wheel in which the steering column operates other features of the vehicle to turn the vehicle.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
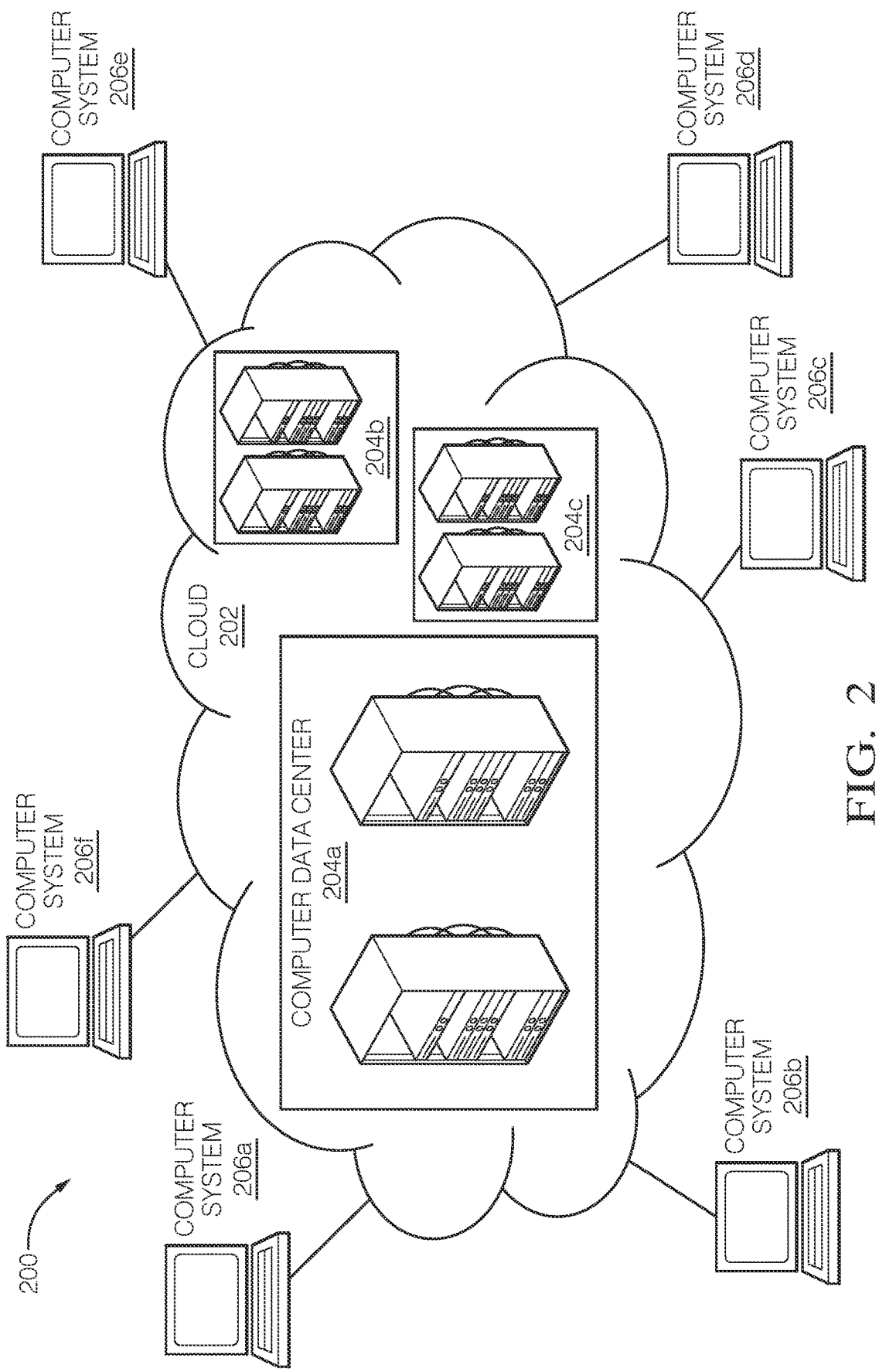
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
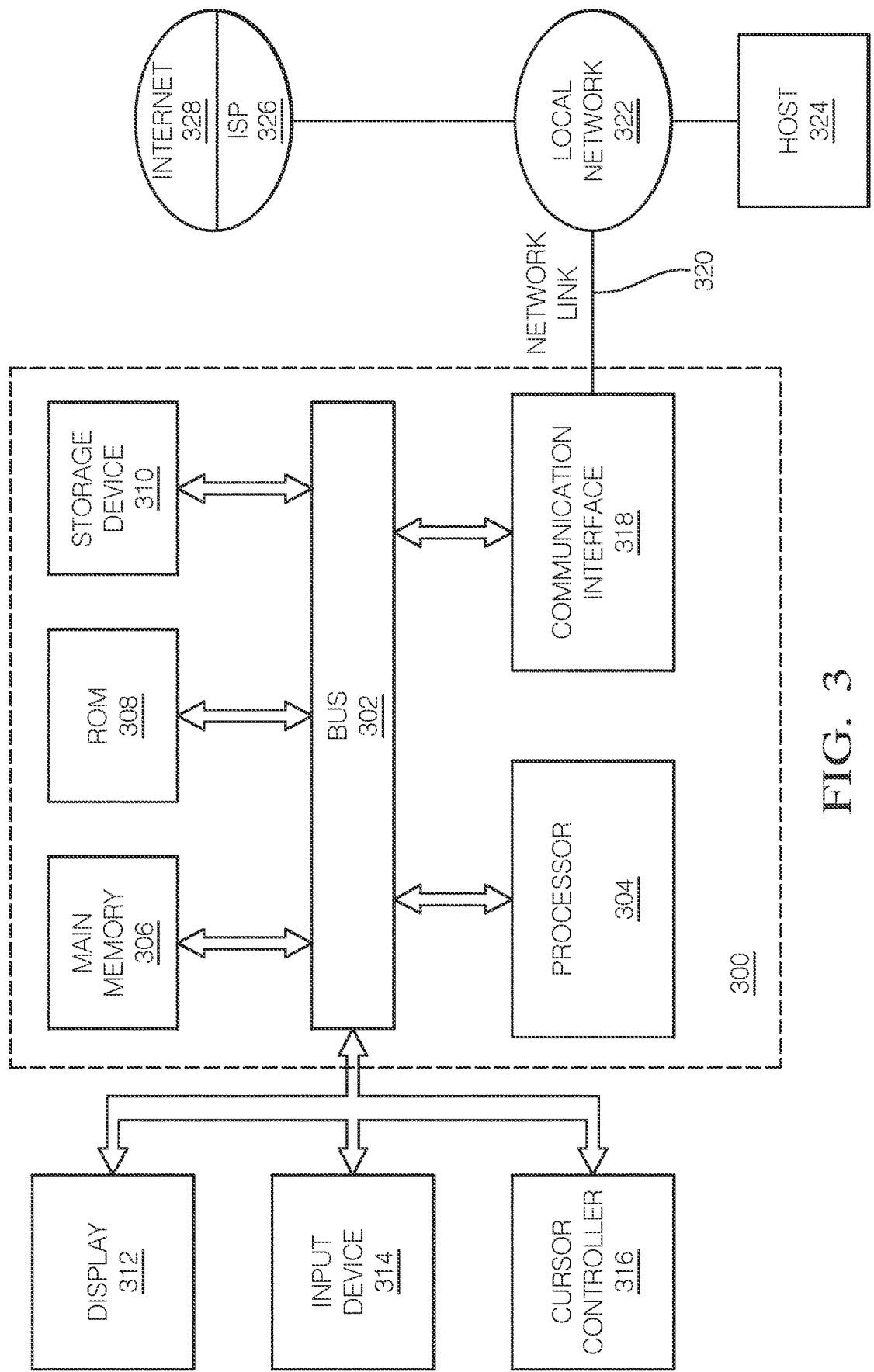
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
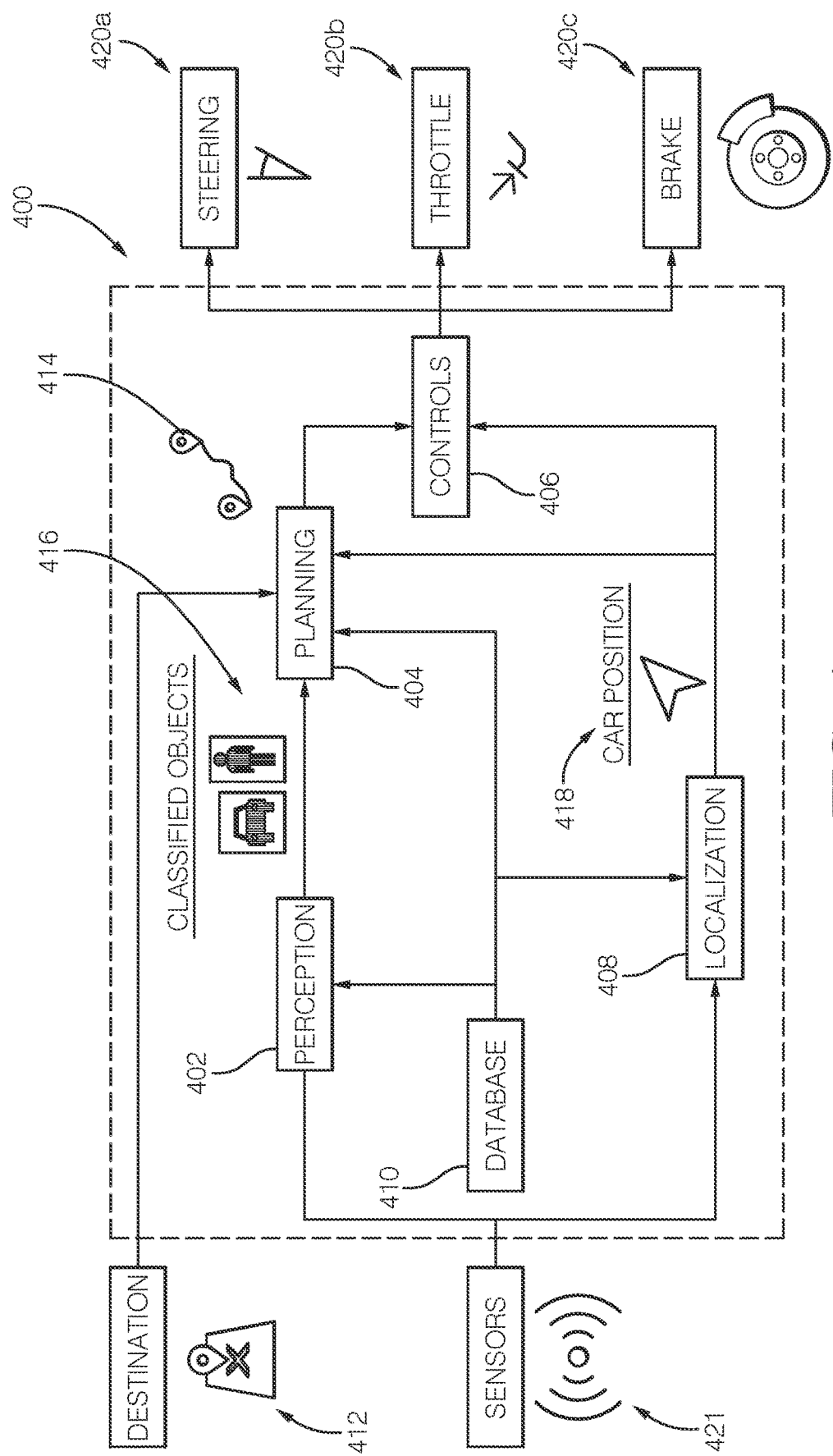
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
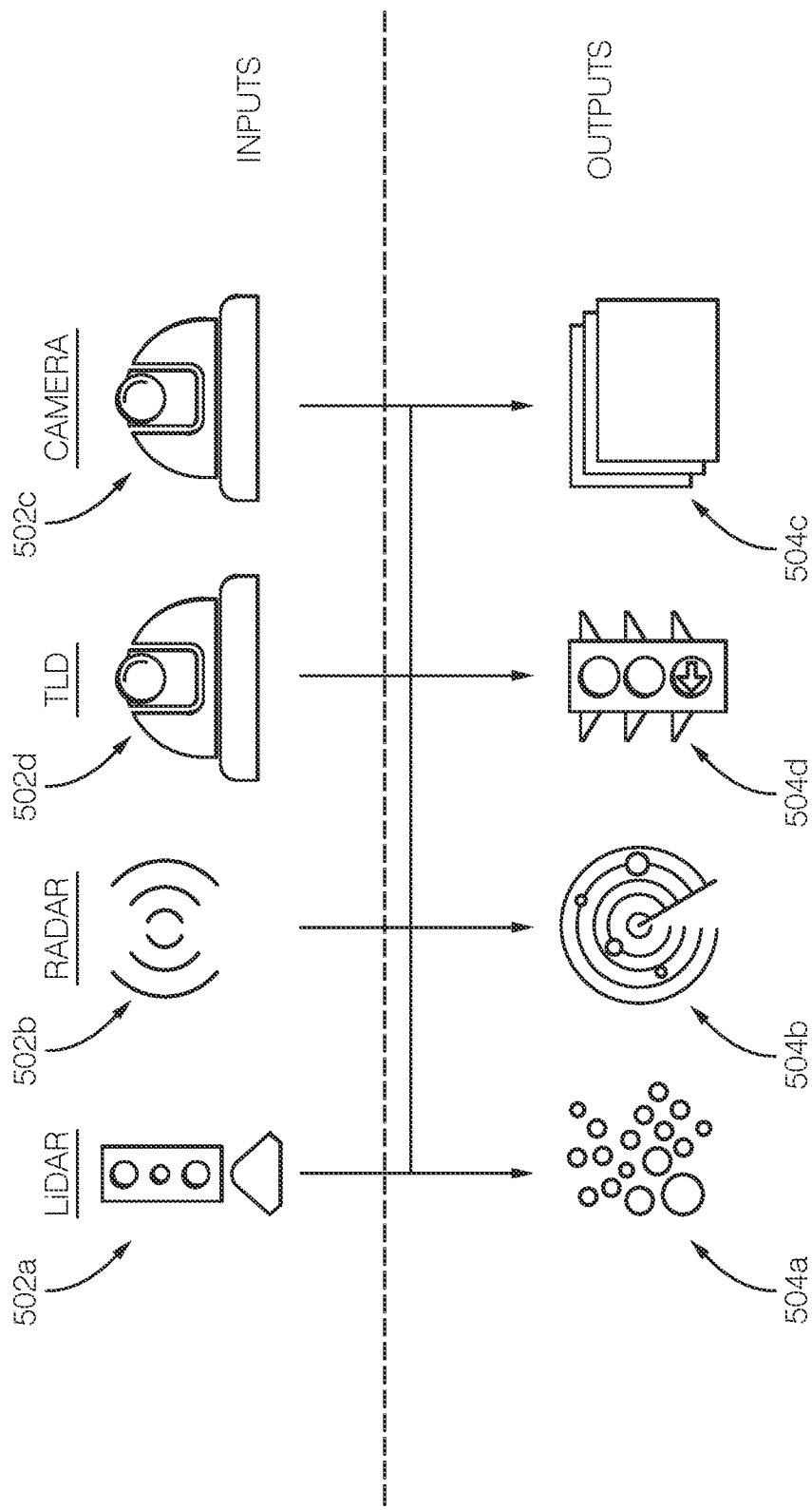
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
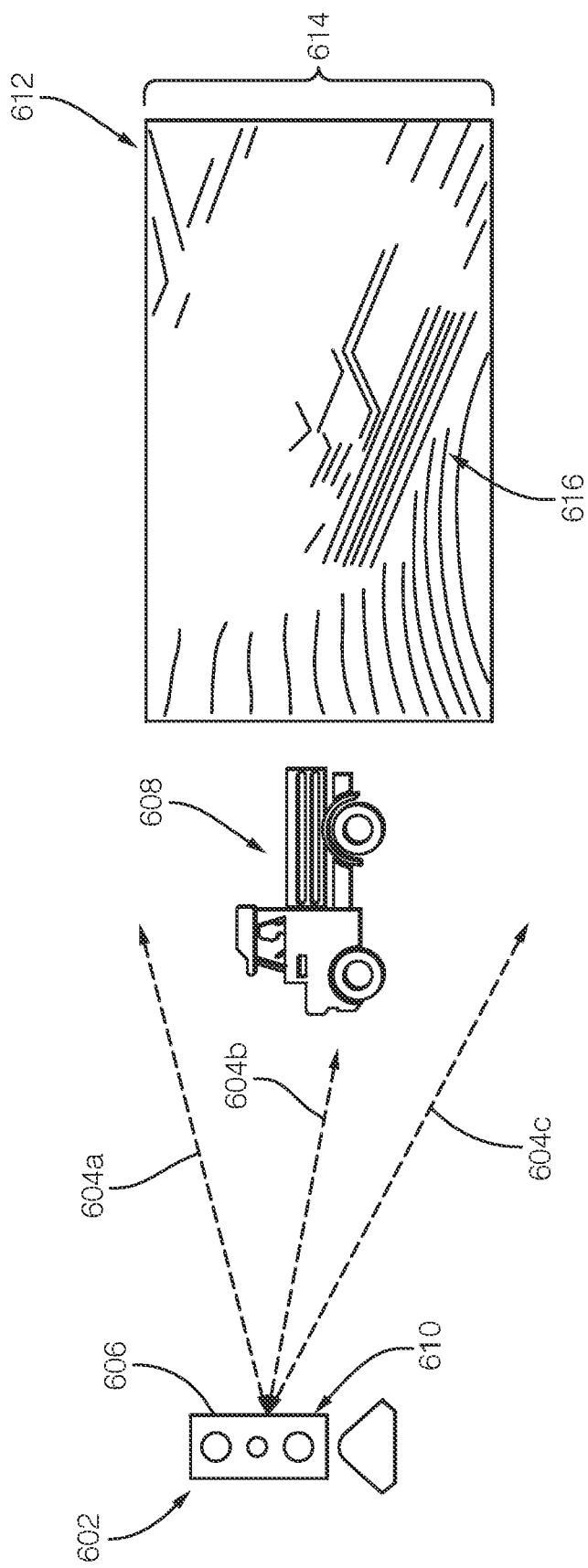
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
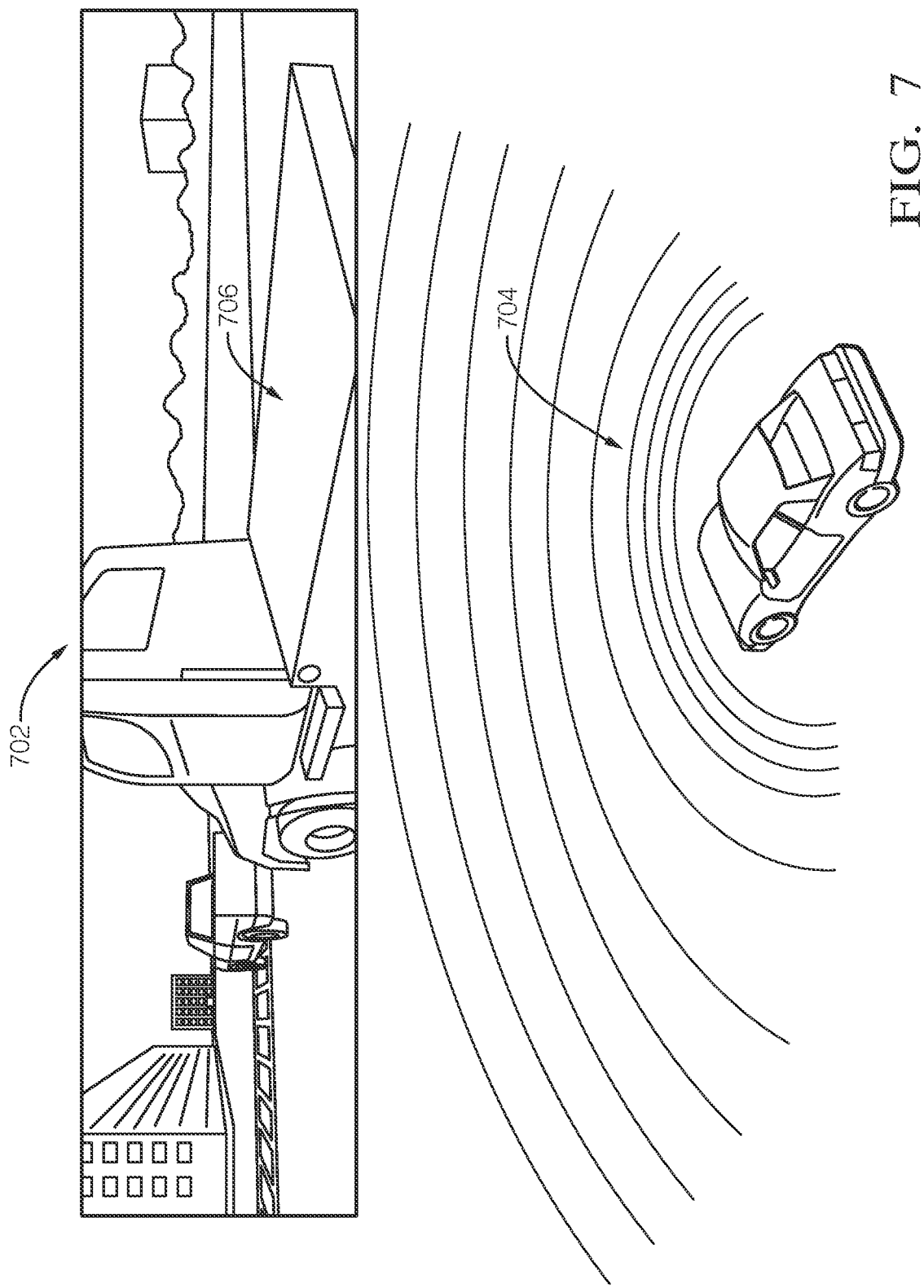
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
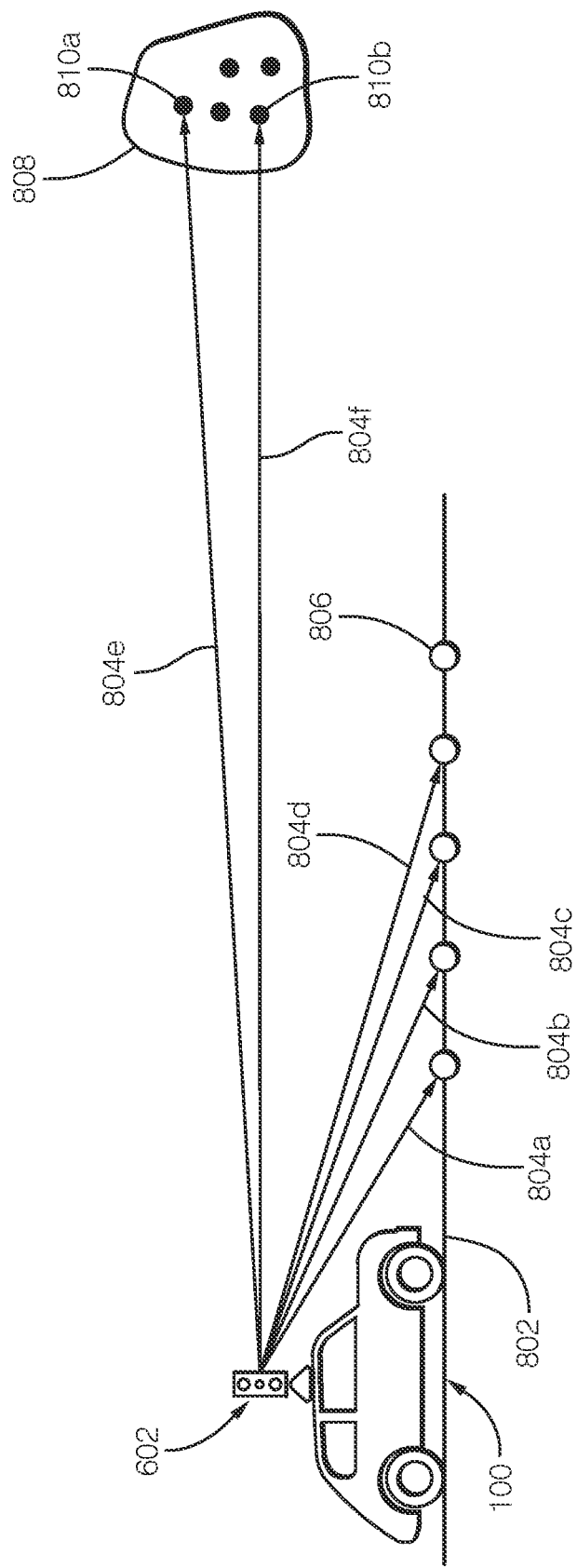
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the system 602 will be reflected from points 810a-b in a manner inconsistent with the expected consistent manner. From this information, the AV 100 can determine that the object 808 is present.

Path Planning

Figure 9:
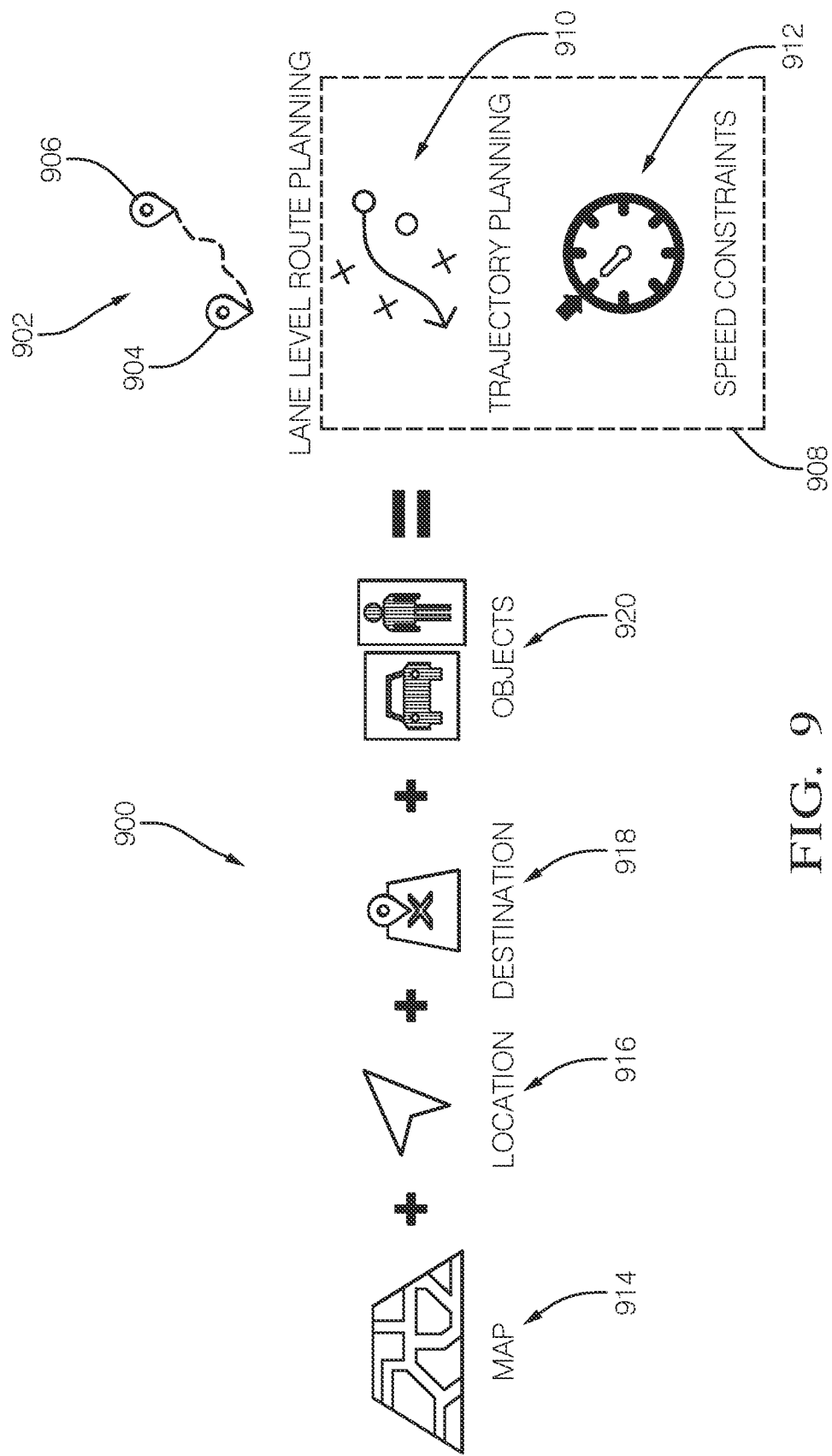
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
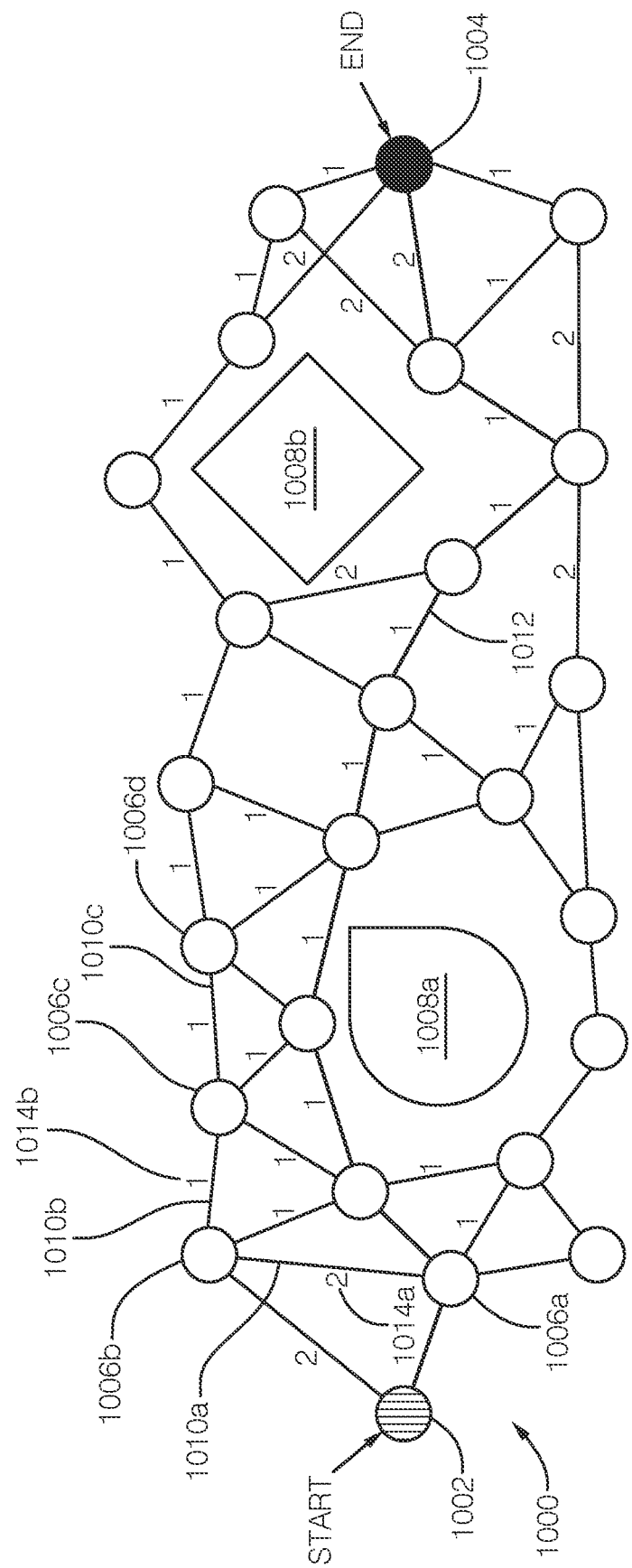
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
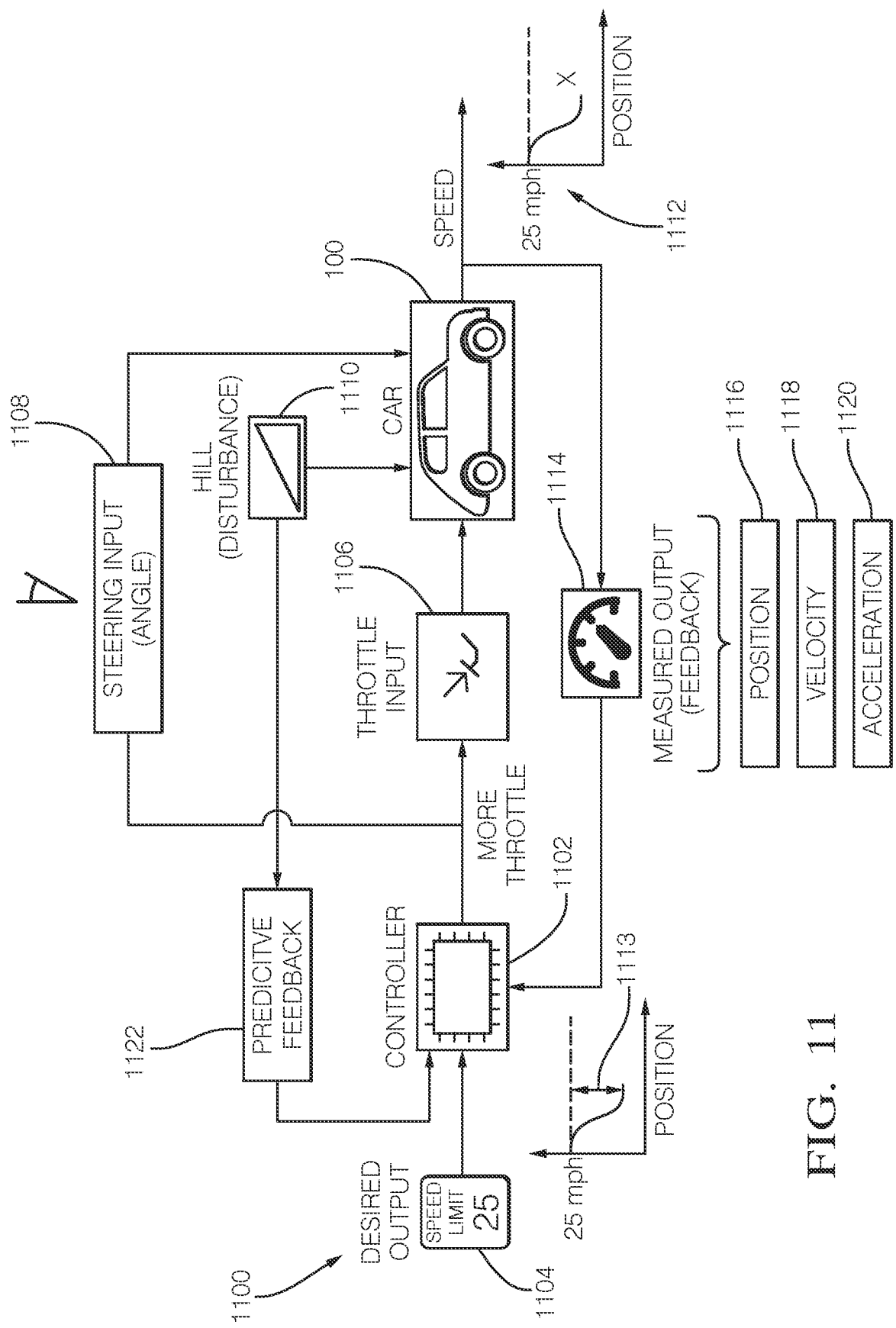
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
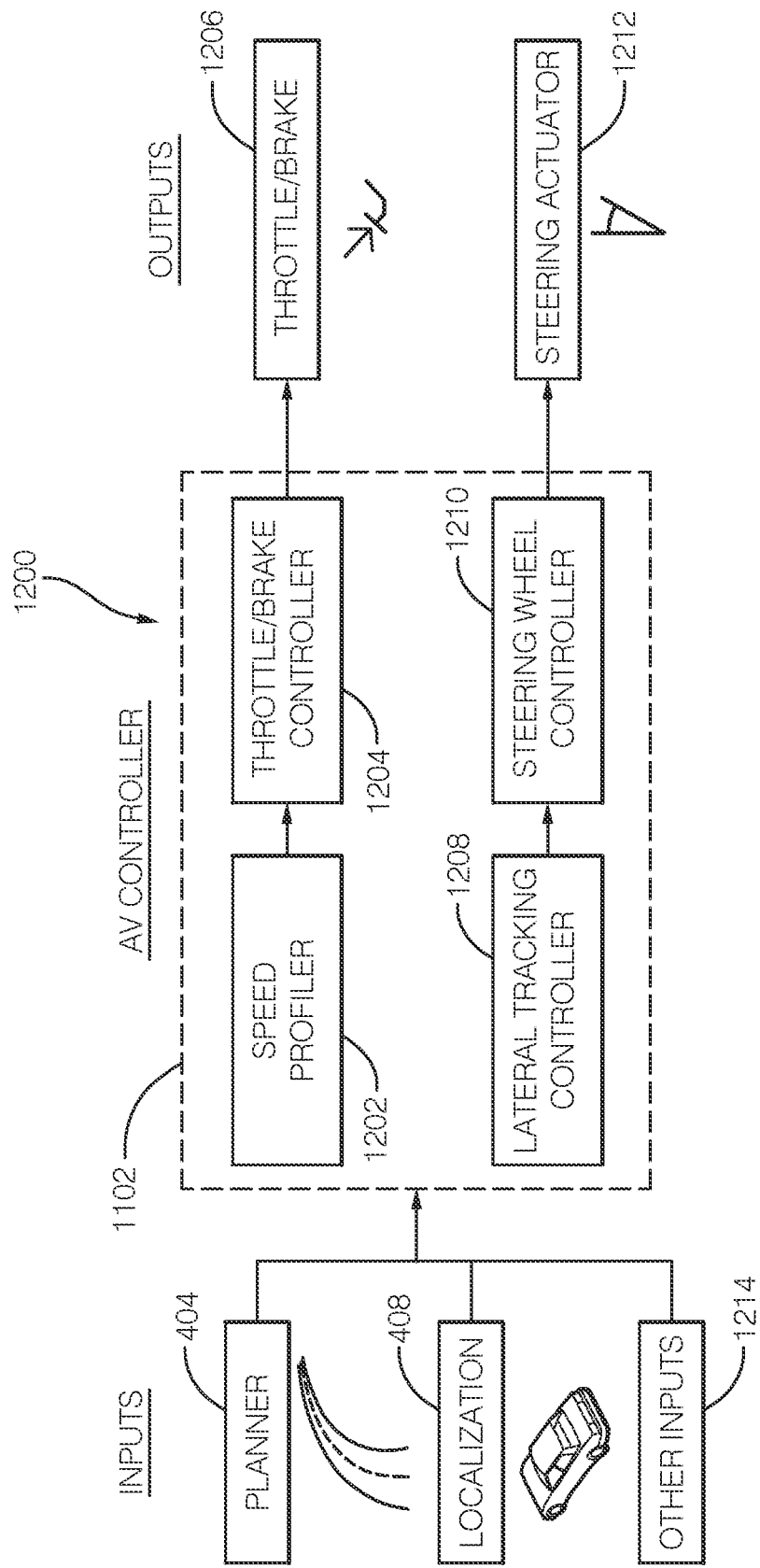
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Steering Angle Control Using Feedforward Signal

Figure 13:
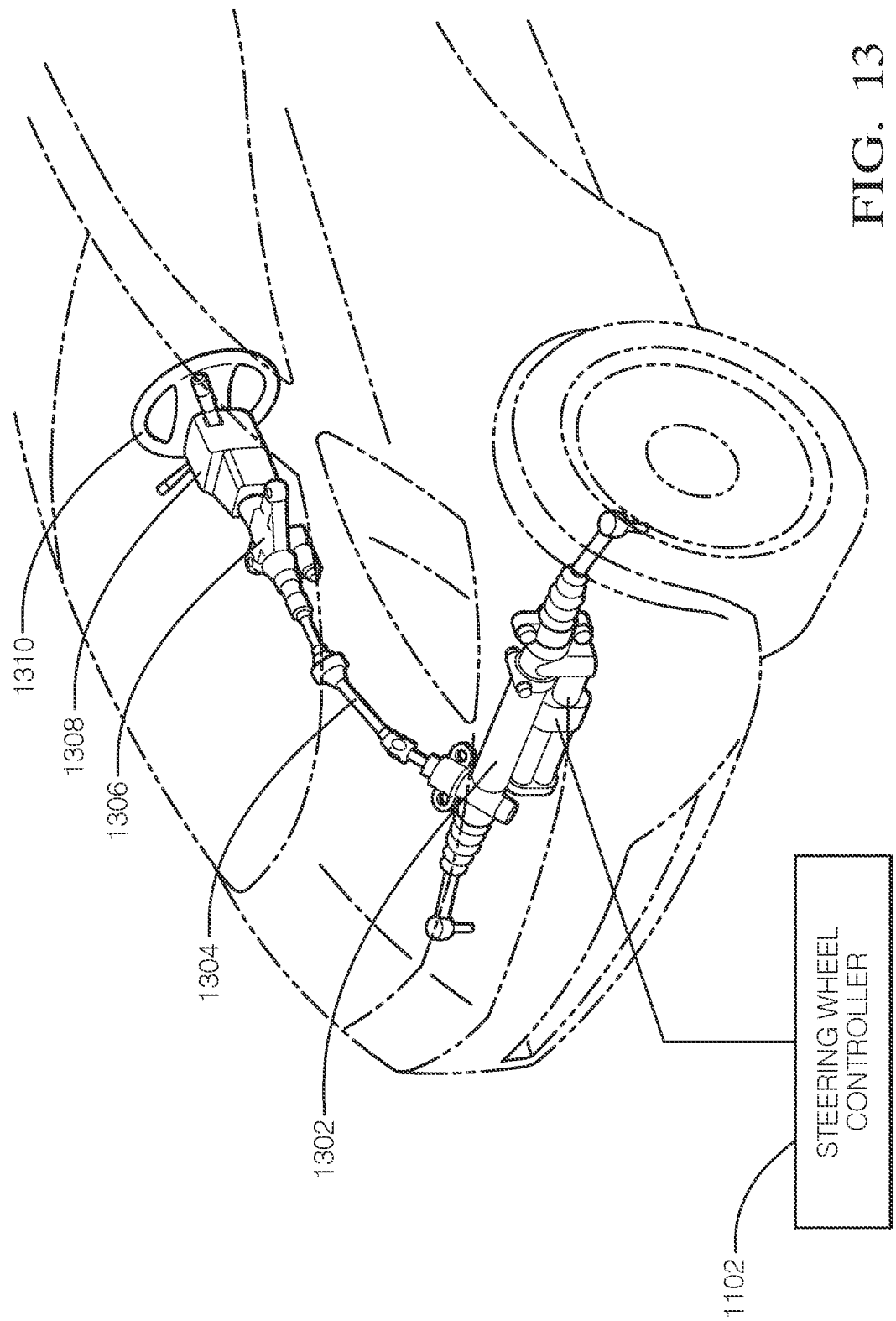
FIG. 13 shows a schematic diagram of a controller connected to a steering wheel.

FIG. 13 shows a schematic diagram of a controller 1102 connected to a steering wheel 1310 of a vehicle. The controller 1102 can be connected to or be a component of the EPS system of the vehicle. A steering control signal applied by the controller 1102 can be transmitted to the steering wheel 1310 through the steering gear 1302, the intermediate shaft 1304, the steering column 1306 and the steering column assembly 1308. In response, the steering wheel 1308 can turn by a steering angle that corresponds to a strength of the steering control signal. In an embodiment, the vehicle does not include steering wheel 1308.

Figure 14:
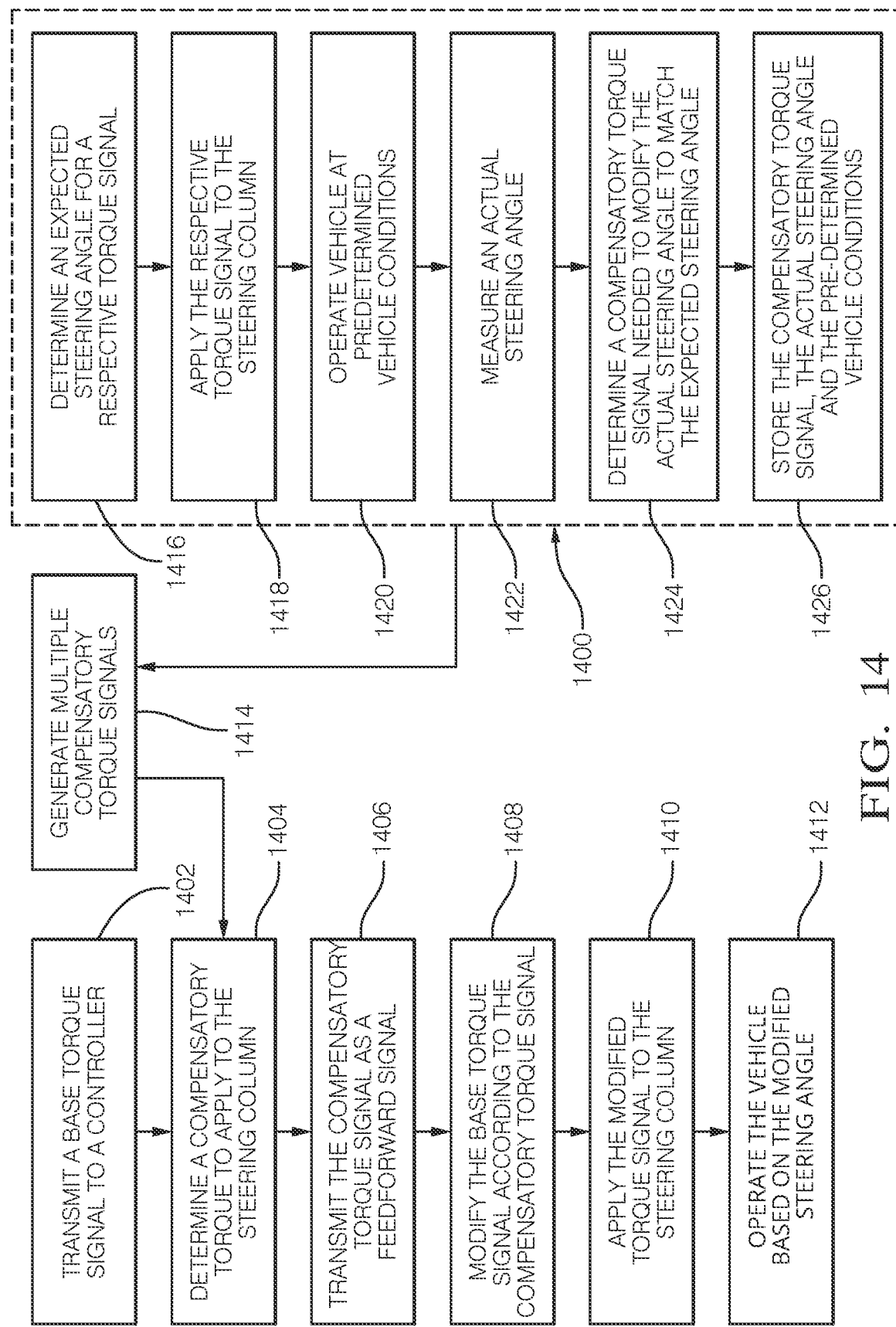
FIG. 14 is a flowchart of an example process to apply compensatory torque to the steering column.

FIG. 14 is a flowchart of an example process 1400 to apply compensatory torque to the steering column. Certain aspects of the process 1400 can be implemented by the planning module 404, the controller 1102 or combinations of them. At 1402, a base torque signal is transmitted to the controller. For example, the planning module 404 transmits a base torque signal to the controller 1102. The base torque signal represents a base torque that the controller 1102 needs to apply to the steering column of the vehicle to control the operation of the vehicle in a manner determined by the planning module 404. In some embodiments, based on a trajectory of the vehicle, the planning module 404 determines a steering angle by which the steering wheel needs to be turned to continue on the trajectory. The planning module 404 determines a base torque to be applied to the steering column to turn the steering wheel to the determined steering angle. The planning module 404 determines a base torque signal that represents the base torque. The planning module 404 generates and transmits the base torque signal to the controller 1102 with an instruction to transmit the base torque signal to the steering column. Alternatively, the planning module 404 transmits the instruction to the controller 1102, which then generates and transmits the base torque signal to the steering column.

Figure 15:
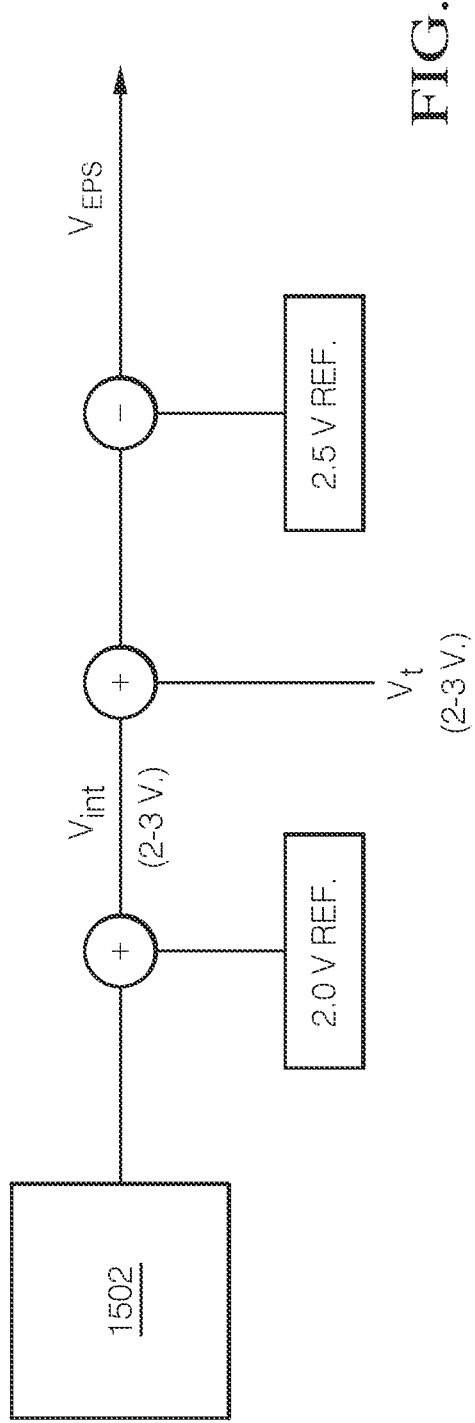
FIG. 15 is an example of voltage signals that can be applied to the EPS system.

In some implementations, the torque signals can be voltage signals. FIG. 15 is an example of voltage signals that can be applied to the EPS system. For example, the controller 1102 can include a digital to analog converter (DAC) 1502. The DAC 1502 can output voltage signals in a range of voltages, for example, 0.0 V to 1.0 V. The EPS system of the vehicle can output a voltage (VEps) in a range different from (for example, higher than) the range of voltages output by the DAC 1502. For example, the EPS system can accept voltages in the range of 2.0 V to 3.0 V, which is the voltage that the steering column torque sensor outputs. The voltage from the DAC 1502 can be augmented by a voltage (Vint) of 2 V (that is, the difference between the DAC 1502 voltage and the voltage acceptable to the EPS system) to arrive at the voltage (Vt) that corresponds to the torque signal. In some embodiments, an averaging mechanism is implemented to augment the voltage from the DAC 1502, for example, a −2.5 V voltage averaging mechanism.

Ideally, the base torque applied to the steering column will turn the steering wheel by the expected steering angle determined by the planning module 404. However, at certain vehicle conditions (for example, vehicle speed, vehicle load, travel conditions, or similar vehicle conditions), an actual steering angle by which the steering wheel turns deviates from the expected steering angle. Such deviation can be observed, for example, at speeds ranging between 7 m/s and 11 m/s. In some embodiments, the controller 1102 can implement a control loop, for example, a proportional-integral-derivative (PID) control loop, to modify the torque signal based on the actual steering angle.

In some embodiments, the planning module 404 determines, based, for example, on vehicle conditions, that a base torque applied to the steering column will result in an actual steering angle that deviates from an expected steering angle determined for that base torque. Accordingly, the planning module 404 compensates for the deviation by applying a compensatory torque as a feedforward signal to the control loop, as described below.

Figure 16:
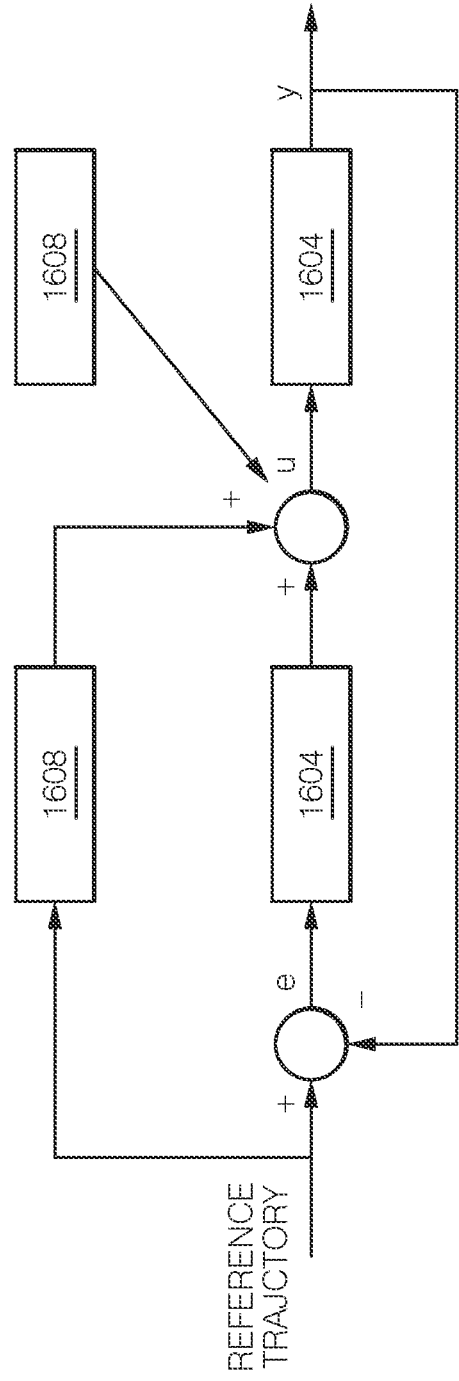
FIG. 16 is a schematic diagram of a control loop with a feedforward function.

FIG. 16 is a schematic diagram of a control loop with a feedforward function. The control loop can be implemented by the controller 1102 or the planning module 404. The control loop is connected to the EPS system 1602 that converts an input torque signal into an output torque to be applied to the steering column. The voltage module 1606 includes the DAC 1502 and the voltage augmenting mechanisms described with reference to FIG. 15. The feedforward function module 1608 applies a feedforward signal as described below. The regulation module 1604 represents the reactive term of the PID control loop that is modified based on the actual steering angle. The regulation module 1604 regulates the error, that is, the deviation between the actual steering angle and the expected steering angle, to zero.

The "Reference Trajectory" represents a signal from the planning module 404 according to which the controller 1102 controls the steering wheel. Based on the "Reference Trajectory," the voltage module 1606 generates a voltage representing a torque signal and transmits the torque signal to the EPS system 1602. The EPS system 1602 applies the torque The actual steering angle of the steering wheel is provided as a feedback by the EPS system 1602 to the controller 1102 or the planning module 404. Based on the feedback, the planning module 404 or the controller 1102 can operate the voltage module 1606 to adjust the voltage (for example, increase or decrease the voltage) such that the actual steering angle matches the expected steering angle.

In some embodiments, the planning module 404 or the controller 1102 can operate the feedforward function module 1608 to apply a feedforward signal to the voltage module 1606 even without the feedback from the EPS system 1602. Returning to FIG. 14, at 1404, a compensatory torque to be applied to the steering column is determined. At 1406, a compensatory torque signal (for example, a voltage signal) representing the compensatory torque is applied as a feedforward signal. Experimental techniques implemented by the planning module 404 to determine the compensatory torque signal are described later. At 1408, the base torque signal is modified according to the compensatory torque signal. For example, the base torque signal output by the voltage module 1606 is augmented by the compensatory torque signal. That is, a magnitude of the base torque signal is increased or decreased by a magnitude of the compensatory torque signal. At 1410, the modified torque signal is applied to the steering column. For example, the voltage module 1606 transmits the modified torque signal to the EPS system 402, which applies the augmented torque signal to the steering column which results in the steering wheel being turned to the expected steering angle. At 1412, the vehicle is operated based on the modified steering angle. The planning module 404 or the controller 1102 (or both) can implement the foregoing steps of the process 1400 for the duration of operation of the vehicle.

To apply a compensatory torque to a base torque as a feedforward signal, the planning module 404 or the controller 1102 generates and stores, ahead of time, multiple compensatory torque signals, each representing a compensatory torque to be applied based on vehicle conditions. The vehicle conditions can include, for example, different speeds of the vehicle, weather conditions in which the vehicle is operating, conditions of the roads on which the vehicle is operating, loads on the vehicle or combinations of them. Loads on the vehicle can include passenger profiles, that is, descriptions of passengers known to ride the vehicle.

Figure 17:
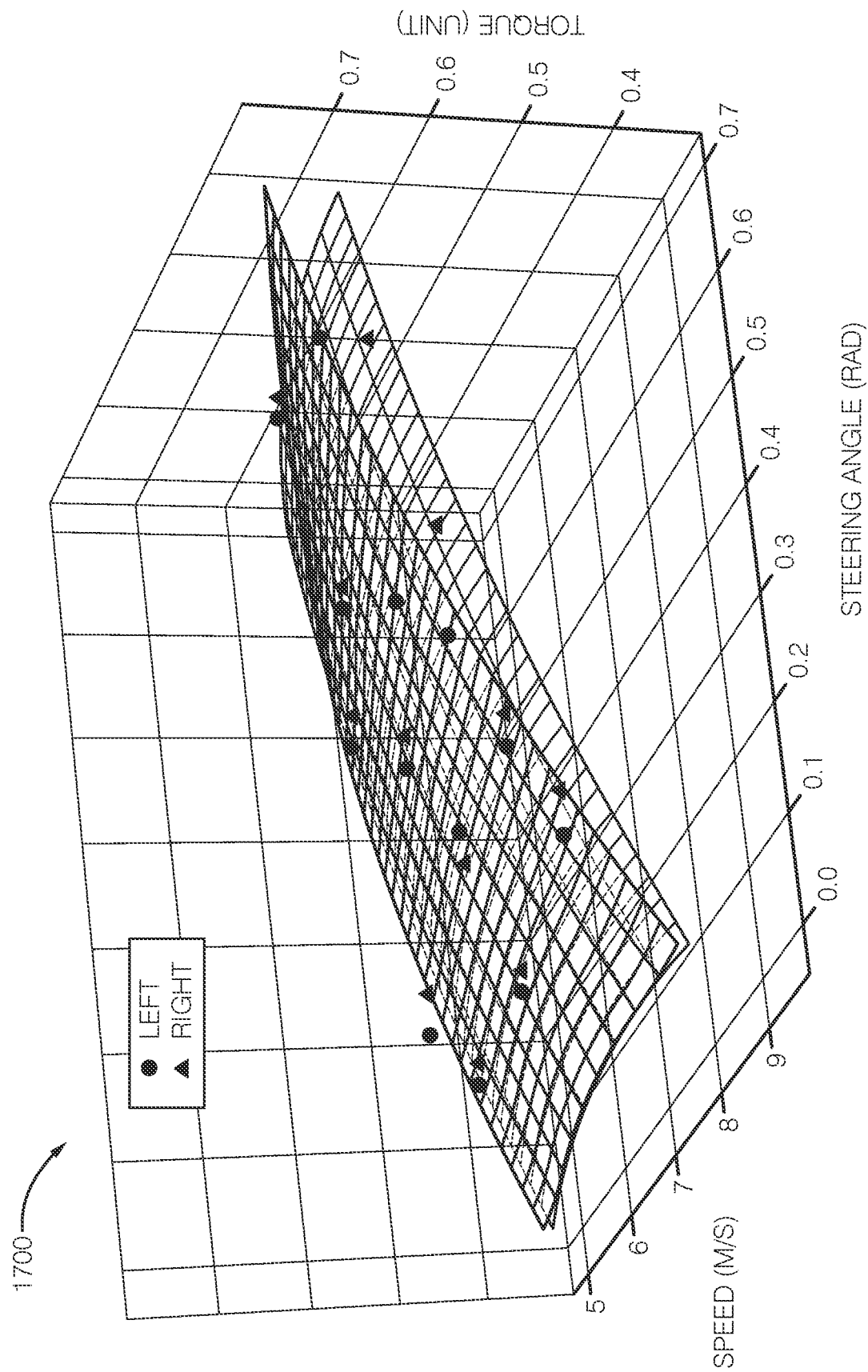
FIG. 17 is a plot relating vehicle conditions and steering angle to feedforward torque.

At 1414, the multiple compensatory torque signals are generated. To do so, in some embodiments, the following process steps can be implemented. In some embodiments, the planning module 404 can assign a quantitative value to each vehicle condition and operate the vehicle at that vehicle condition. The planning module 404 can determine a compensatory torque signal for each vehicle condition. At 1416, an expected steering angle for a respective torque signal is determined. For example, the planning module 404 can determine an expected steering angle for the base torque signal. In some embodiments, the planning module 404 determines the expected steering angle by curve fitting a $2^{nd}$ order polynomial surface that relates vehicle conditions (for example, speed) and steering angle to a feedforward torque. FIG. 17 is a plot 1700 of relating vehicle conditions and steering angle to feedforward torque. In some embodiments, the planning module 404 determines the expected steering angle by measuring the steering angle of the steering wheel at steady speed.

At 1418, the torque signal can be applied to the steering column. For example, the planning module 404 can apply a base torque signal to the controller 1102 as described earlier. At 1420, the vehicle can be operated at pre-determined vehicle conditions. For example, the planning module 404 can operate the vehicle at each vehicle condition, as described earlier. At 1422, an actual steering angle is measured. For example, the EPS system 1602 can measure an actual steering angle by which the steering wheel has turned in response to the base torque signal received from the planning module 404. At 1424, a compensatory torque signal needed to modify the actual steering angle is determined. For example, the planning module 404 can determine a compensatory torque signal to be applied to the base torque signal to eliminate a deviation between the expected steering angle and the actual steering angle. At 1426, the compensatory torque signal, the actual steering angle and the pre-determined vehicle conditions can be stored. For example, the planning module 404 can generate a data set that includes the compensatory torque signal, the base torque signal, and the quantitative value assigned to the vehicle condition.

The planning module 404 can implement the process steps 1416-1426 multiple times at different vehicle conditions and generate multiple data sets. A data set can include one vehicle condition (for example, a vehicle speed) or multiple vehicle conditions (for example, vehicle speeds on a rainy day, vehicle speeds on unpaved roads, etc.). In this manner, the planning module 404 can implement experimental techniques to generate and store compensatory torque signals to be applied as feedforward signals. During vehicle operation, the planning module 404 can detect vehicle operating conditions and, from among the stored data sets, identify the data set that substantially matches the vehicle operating conditions. From that data set, the planning module 404 can identify the compensatory torque signal and transmit the compensatory torque signal as the feedforward signal. In some embodiments, the planning module 404 can apply the compensatory torque signal in real-time. By real-time, it is meant that a time between the planning module 404 determining to apply the feedforward signal and identifying and transmitting the feedforward signal can be negligible (for example, of the order of nanoseconds, microseconds or milliseconds).

For example, the planning module 404 can apply the compensatory torque signal based on weather conditions in which the vehicle is operated. The weather condition can include, for example, rain, snow, high winds, other weather conditions or combinations of them. The planning module 404 can determine the weather conditions based on information sensed by sensors mounted on the AV 100, based on the geographic location in and the time at which the AV 100 is driving, from a remote location, or combinations of them. As the velocity of the AV 100 increases when the AV 100 is being driven under such extreme weather conditions, the deviation between an estimated steering angle and an actual steering angle can be greater than when the AV 100 is being driven under normal weather conditions. In some embodiments, the planning module 404 can determine a change in the weather condition and responsively (for example, in real-time), apply the feedforward compensatory torque signal to decrease or eliminate the deviation between the estimated steering angle and the actual steering angle.

In another example, the planning module 404 can apply the compensatory torque signal based on road conditions on which the vehicle is driven. The road condition can include, for example, wet roads, slippery roads, dirt roads, damaged roads or other road conditions. The planning module 404 can determine the road conditions based on information sensed by sensors mounted on the AV 100, based on the geographic location in which the AV 100 is driving, from a remote location, or combinations of them. As the velocity of the AV 100 increases when the AV 100 is being driven under such extreme road conditions, the deviation between an estimated steering angle and an actual steering angle can be greater than when the AV 100 is being driven under normal road conditions. In some embodiments, the planning module 404 can determine a change in the road condition and responsively (for example, in real-time), apply the feedforward compensatory torque signal to decrease or eliminate the deviation between the estimated steering angle and the actual steering angle.

In a further example, the planning module 404 can apply the compensatory torque signal based on load on the vehicle. The load can be greater than a normal load, for example, due to increased occupancy or a heavy item being transported in the vehicle. The planning module 404 can determine the load based on information sensed by sensors mounted on the AV 100, from a remote location, or combinations of them. As the velocity of the AV 100 increases when the AV 100 is being driven under high load, the deviation between an estimated steering angle and an actual steering angle can be greater than when the AV 100 is being driven under normal load. In some embodiments, the planning module 404 can determine a change in the load and responsively (for example, in real-time), apply the feedforward compensatory torque signal to decrease or eliminate the deviation between the estimated steering angle and the actual steering angle.

In another example, the planning module 404 can apply the compensatory torque signal based on a passenger profile of one or more passengers of the AV 100. The planning module 404 can store generic driving preferences applicable to any passenger of the AV 100. The generic driving preferences can specify a passenger's driving preferences, such as, taking the shortest route to the destination, avoiding freeways or tolls, to name a few. Based on the generic driving preferences, the planning module 404 can determine a set of vehicle driving conditions to be applied to satisfy the generic driving preferences. Also, the planning module 404 can determine a compensatory torque signal to be applied to the steering column for the set of vehicle driving conditions. Over time, the planning module 404 can modify the generic driving preferences based on each passenger that uses the AV 100. Subsequently, the planning module 404 can identify the passenger that has boarded the vehicle, identify the passenger profile for that passenger, and determine the compensatory torque signal to be applied to the steering column for a set of vehicle driving conditions that will satisfy that passenger's driving preferences. The planning module 404 can apply the determined compensatory torque signal in real-time.

In an embodiment, a quantity of the compensatory torque signal to be applied to the steering column can be determined by utilizing trained models for the AV 100. The trained models may be generated by applying machine learning techniques to historical traversal data based on which previous compensatory torque signals were generated and applied. The trained model may also take into account time of day, traffic conditions, pedestrian density based on audiovisual or other data, and weather, among other factors. For example, the vehicle driving conditions and the compensatory torque signals applied for the vehicle driving conditions can be generated and stored. The techniques described here to determine the quantity of the compensatory torque signal can be applied to the historical traversal data. Machine learning techniques can be implemented to train the planning module 404 to determine the quantity of the compensatory torque signal for any combination of vehicle conditions from the historical traversal data. The quantities determined by machine learning can be improved with the quantities determined in real-time. In addition, the historical traversal data can be updated to improve the machine learning techniques.

In some embodiments, the process steps 1416-1426 can be implemented by a computer system remote to the vehicle or can be implemented by the planning module 404 and the data sets transmitted to the computer system remote to the vehicle. In such instances, the compensatory torque to be applied to the EPS system 1602 can be received by the planning module 404 from the remote computer system.

In some embodiments, the planning module 404 can compensate for the deviation between the expected steering angle and the actual steering angle up to a pre-determined steering angle threshold, for example, 10° or some other angle. A deviation beyond the pre-determined threshold indicates a mechanical issue with the vehicle requiring attention in a repair shop. In such instances, that is, upon determining that the deviation exceeds the pre-determined threshold, the planning module 404 can operate the vehicle to a target location, for example, a repair shop or other target location. In some embodiments, the planning module 404 can implement operations in addition to operating the vehicle to the target location. The additional operations can include, for example, transmitting alerts to be displayed to a passenger in the vehicle, to the target location, to a different location, restricting instructions that can be sent to the EPS system 1602 or combinations of them.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method comprising:
receiving, by at least one processor, a plurality of predetermined compensatory torque signals, each of the plurality of predetermined compensatory torque signals comprising a predetermined amount of compensatory torque by which a base torque is to be adjusted so that an actual steering angle of a steering wheel of a vehicle substantially matches an expected steering angle of the steering wheel of the vehicle;

determining, by the at least one processor, a base torque signal for producing an expected steering angle of the steering wheel of the vehicle;

determining, by the at least one processor, a compensatory torque signal from the plurality of predetermined compensatory torque signals to modify an actual steering angle of the steering wheel of the vehicle to match the expected steering angle of the steering wheel;

generating, by the at least one processor, a modified torque signal by modifying the base torque signal in accordance with the compensatory torque signal;

transmitting, by the at least one processor, the modified torque signal to an electric power steering (EPS) system that controls the steering angle of the steering wheel; and causing the EPS system to apply the modified torque signal to produce the expected steering angle of the steering wheel.

2. The method of claim 1, wherein modifying the base torque signal in accordance with the compensatory torque signal comprises adding a magnitude of the compensatory torque signal to a magnitude of the base torque signal.

3. The method of claim 1, wherein at least one of the compensatory torque signal or the base torque signal is a voltage.

4. The method of claim 1, wherein the compensatory torque signal is transmitted to the EPS system as a feedforward signal.

5. The method of claim 1, further comprising generating the plurality of predetermined compensatory torque signals.

6. The method of claim 5, wherein generating the plurality of predetermined compensatory torque signals comprises, for each generated compensatory torque signal:

determining an expected steering angle of the steering wheel for the respective torque signal;

causing the EPS system to apply the respective torque signal to produce a steering angle;

causing the vehicle to operate at the steering angle at a pre-determined speed;

determining an actual steering angle of the steering wheel for the respective torque signal; and storing the generated compensatory torque signal and the actual steering angle as a data pair.

7. The method of claim 6, wherein determining the expected steering angle of the steering wheel for the respective torque signal comprises curve fitting a polynomial surface that relates vehicle speed and steering angle to applied torque.

8. The method of claim 1, further comprising:

determining a difference between the expected steering angle and the actual steering angle; and in accordance with a determination that the difference exceeds a predetermined threshold, causing the vehicle to operate to a target location.

9. The method of claim 1, further comprising:

determining, by the at least one processor, at least one operating condition of the vehicle; and determining the compensatory torque signal according to the at least one operating condition.

10. The method of claim 9, wherein the compensatory torque signal is determined according to the at least one operating condition in real-time.

11. The method of claim 9, wherein the at least one operating condition comprises a weather condition in which the vehicle is operated.

12. The method of claim 9, wherein the at least one operating condition comprises a condition of a road on which the vehicle is driven.

13. The method of claim 9, wherein the at least one operating condition comprises a load carried by the vehicle.

14. The method of claim 9, wherein the at least one operating condition comprises a driving condition stored in a passenger profile comprising driving preferences of one or more passengers of the vehicle.

15. A system, comprising:

at least one processor; and at least one memory storing instructions thereon that, when executed by the at least one processor, cause the at least one processor to carry out operations comprising:

receiving a plurality of predetermined compensatory torque signals, each of the plurality of predetermined compensatory torque signals comprising a predetermined amount of compensatory torque by which a base torque is to be adjusted so that an actual steering angle of a steering wheel of a vehicle substantially matches an expected steering angle of the steering wheel of the vehicle;

determining a base torque signal for producing an expected steering angle of the steering wheel of the vehicle;

determining a compensatory torque signal from the plurality of predetermined compensatory torque signals to modify an actual steering angle of the steering wheel of the vehicle to match the expected steering angle of the steering wheel;

generating a modified torque signal by modifying the base torque signal in accordance with the compensatory torque signal; and transmitting the modified torque signal to an electric power steering (EPS) system that controls the steering angle of the steering wheel of the vehicle, wherein the EPS system is configured to apply the modified torque signal to produce the expected steering angle of the steering wheel.

16. The system of claim 15, wherein the at least one memory stores instructions thereon that, when executed by the at least one processor, cause the at least one processor to carry out operations comprising:

generating each of the plurality of predetermined compensatory torque signals by:

determining an expected steering angle of the steering wheel for the respective torque signal;

causing the EPS system to apply the respective torque signal to produce a steering angle;

causing the vehicle to operate at the steering angle at a pre-determined speed;

determining an actual steering angle of the steering wheel for the respective torque signal; and storing the generated compensatory torque signal and the actual steering angle as a data pair.

17. The system of claim 15, wherein the at least one memory stores instructions thereon that, when executed by the at least one processor, cause the at least one processor to carry out operations comprising:

determining at least one operating condition of the vehicle; and determining the compensatory torque signal according to the at least one operating condition.

18. A non-transitory computer-readable medium comprising instructions stored thereon that, when executed by at least one processor, cause the at least one processor to carry out operations comprising:

receiving a plurality of predetermined compensatory torque signals, each of the plurality of predetermined compensatory torque signals comprising a predetermined amount of compensatory torque by which a base torque is to be adjusted so that an actual steering angle of a steering wheel of a vehicle substantially matches an expected steering angle of the steering wheel of the vehicle;

determining a base torque signal for producing an expected steering angle of the steering wheel of the vehicle;

determining a compensatory torque signal from the plurality of predetermined compensatory torque signals to modify an actual steering angle of the steering wheel of the vehicle to match the expected steering angle of the steering wheel;

generating a modified torque signal by modifying the base torque signal in accordance with the compensatory torque signal; and transmitting the modified torque signal to an electric power steering (EPS) system that controls the steering angle of the steering wheel of the vehicle, wherein the EPS system is configured to apply the modified torque signal to produce the expected steering angle of the steering wheel.

19. The non-transitory computer-readable medium of claim 18 comprising instructions stored thereon that, when executed by the at least one processor, cause the at least one processor to carry out operations comprising:

generating each of the plurality of predetermined compensatory torque signals by:
  determining an expected steering angle of the steering wheel for the respective torque signal;
  causing the EPS system to apply the respective torque signal to produce a steering angle;
  causing the vehicle to operate at the steering angle at a pre-determined speed;
  determining an actual steering angle of the steering wheel for the respective torque signal; and
  storing the generated compensatory torque signal and the actual steering angle as a data pair.

20. The non-transitory computer-readable medium of claim 18 comprising instructions stored thereon that, when executed by the at least one processor, cause the at least one processor to carry out operations comprising:

determining at least one operating condition of the vehicle; and determining the compensatory torque signal according to the at least one operating condition.

* * * * *